United States Patent
Jacobs, II et al.

(10) Patent No.: US 11,410,224 B1
(45) Date of Patent: Aug. 9, 2022

(54) METHODS AND SOFTWARE FOR REQUESTING A PRICING IN AN ELECTRONIC MARKETPLACE USING A USER-MODIFIABLE SPECTRUM INTERFACE

(71) Applicant: Desprez, LLC, New London, NH (US)

(72) Inventors: James L. Jacobs, II, Amherst, NH (US); John E. Cronin, Bonita Springs, FL (US); Christopher M. Huffines, Williston, VT (US); Steven M. Lynch, Hudson, NH (US)

(73) Assignee: Desprez, LLC, New London, NH (US)

( * ) Notice: Subject to any disclaimer, the term of this patent is extended or adjusted under 35 U.S.C. 154(b) by 887 days.

(21) Appl. No.: 14/229,008

(22) Filed: Mar. 28, 2014

(51) Int. Cl.
  *G06F 30/00* (2020.01)
  *G06Q 30/06* (2012.01)
  *G06Q 30/02* (2012.01)

(52) U.S. Cl.
  CPC ..... *G06Q 30/0643* (2013.01); *G06Q 30/0201* (2013.01)

(58) Field of Classification Search
  None
  See application file for complete search history.

(56) References Cited

U.S. PATENT DOCUMENTS

| | | | | |
|---|---|---|---|---|
| 4,495,559 A * | 1/1985 | Gelatt, Jr | ............ | G06F 17/5072 700/28 |
| 5,117,354 A * | 5/1992 | Long | ................... | G06Q 10/087 700/104 |
| 5,465,221 A * | 11/1995 | Merat | ............... | G05B 19/41875 700/160 |
| 5,495,430 A * | 2/1996 | Matsunari | ........ | G05B 19/41865 700/100 |
| 5,552,995 A * | 9/1996 | Sebastian | ............ | B29C 33/3835 700/182 |
| 5,570,291 A * | 10/1996 | Dudle | ............... | G05B 19/41865 101/483 |

(Continued)

FOREIGN PATENT DOCUMENTS

| WO | 154476 A2 | 8/2001 |
|---|---|---|
| WO | 171626 A2 | 9/2001 |

(Continued)

OTHER PUBLICATIONS

Autodesk Mechanical Desktop 6 User's Guide May 3, 2001 (Year: 2001).*

(Continued)

*Primary Examiner* — Robert D Rines
*Assistant Examiner* — Alissa D Karmis
(74) *Attorney, Agent, or Firm* — Caldwell Intellectual Property Law (57) ABSTRACT

In an exemplary embodiment, software made in accordance with the present invention displays a marketplace interface, which displays at least a portion of a CAD model and a set of marketplace tool selectors to a user such that the user can manipulate the tool selectors to interact with an electronic marketplace. The marketplace interface may include a spectrum interface designed and configured to allow the user to selectively augment the marketplace interface with additional functionality. Various corresponding and related systems, methods, and software are described.

10 Claims, 6 Drawing Sheets

(56) References Cited

U.S. PATENT DOCUMENTS

| | | | | |
|---|---|---|---|---|
| 5,655,087 A * | 8/1997 | Hino | G06Q 10/0875 | 700/107 |
| 5,758,328 A * | 5/1998 | Giovannoli | G06Q 30/06 | 705/26.4 |
| 5,847,971 A * | 12/1998 | Ladner | G06Q 10/087 | 703/1 |
| 5,870,719 A * | 2/1999 | Maritzen | G06Q 30/02 | 700/90 |
| 5,937,189 A * | 8/1999 | Branson | G06F 9/50 | 717/101 |
| 6,031,535 A * | 2/2000 | Barton | G06F 3/0482 | 715/840 |
| 6,112,133 A * | 8/2000 | Fishman | G05B 19/40937 | 700/180 |
| 6,295,513 B1 * | 9/2001 | Thackston | G05B 19/4099 | 703/1 |
| 6,341,271 B1 * | 1/2002 | Salvo | G06Q 10/087 | 705/28 |
| 6,343,285 B1 * | 1/2002 | Tanaka | G06Q 10/04 | 700/106 |
| 6,611,725 B1 * | 8/2003 | Harrison | G06T 19/00 | 345/420 |
| 6,647,373 B1 * | 11/2003 | Carlton-Foss | G06Q 40/04 | 705/26.3 |
| 6,701,200 B1 * | 3/2004 | Lukis | B22C 19/04 | 264/401 |
| 6,750,864 B1 * | 6/2004 | Anwar | G06F 17/30489 | 345/440 |
| 6,834,312 B2 * | 12/2004 | Edwards | H04L 29/06 | 709/231 |
| 6,836,699 B2 * | 12/2004 | Lukis | B22C 19/04 | 264/401 |
| 6,859,768 B1 * | 2/2005 | Wakelam | G06F 17/5004 | 703/1 |
| 6,917,847 B2 * | 7/2005 | Littlejohn | G05B 19/4097 | 700/108 |
| 6,922,701 B1 * | 7/2005 | Ananian | G06F 17/5004 | |
| 7,006,084 B1 * | 2/2006 | Buss | G05B 19/408 | 345/419 |
| 7,058,465 B2 * | 6/2006 | Emori | G05B 19/40937 | 700/100 |
| 7,079,990 B2 | 7/2006 | Haller et al. | | |
| 7,085,687 B2 * | 8/2006 | Eckenwiler | G05B 19/41885 | 53/452 |
| 7,089,082 B1 * | 8/2006 | Lukis | G05B 19/4097 | 264/453 |
| 7,123,986 B2 * | 10/2006 | Lukis | B29C 33/3835 | 700/197 |
| 7,134,096 B2 * | 11/2006 | Brathwaite | G06F 17/50 | 700/121 |
| 7,299,101 B2 * | 11/2007 | Lukis | G06F 17/50 | 345/619 |
| 7,305,367 B1 * | 12/2007 | Hollis | G06Q 30/0283 | 700/157 |
| 7,327,869 B2 * | 2/2008 | Boyer | G05B 23/0216 | 382/141 |
| 7,343,212 B1 * | 3/2008 | Brearley | G06Q 10/087 | 700/106 |
| 7,359,886 B2 * | 4/2008 | Sakurai | B29C 45/26 | 700/96 |
| 7,366,643 B2 * | 4/2008 | Verdura | G06F 17/50 | 53/452 |
| 7,369,970 B2 * | 5/2008 | Shimizu | G06Q 10/0875 | 700/97 |
| 7,418,307 B2 * | 8/2008 | Katircioglu | G06Q 10/06 | 700/106 |
| 7,467,074 B2 | 12/2008 | Faruque et al. | | |
| 7,484,183 B2 * | 1/2009 | Look | G06F 30/13 | 715/773 |
| 7,496,487 B2 | 2/2009 | Wakelam et al. | | |
| 7,496,528 B2 * | 2/2009 | Lukis | B22C 19/04 | 705/26.4 |
| 7,499,871 B1 * | 3/2009 | McBrayer | G06Q 10/063 | 705/7.11 |
| 7,523,411 B2 * | 4/2009 | Carlin | G06Q 30/02 | 345/419 |
| 7,526,358 B2 * | 4/2009 | Kawano | G06F 17/50 | 700/146 |
| 7,529,650 B2 | 5/2009 | Wakelam et al. | | |
| 7,565,139 B2 * | 7/2009 | Neven, Sr. | G06K 9/6807 | 455/3.01 |
| 7,565,223 B2 * | 7/2009 | Moldenhauer | B23H 11/00 | 219/69.12 |
| 7,567,849 B1 * | 7/2009 | Trammell | G06Q 30/0603 | 700/97 |
| 7,568,155 B1 * | 7/2009 | Axe | G06F 17/50 | 715/243 |
| 7,571,166 B1 * | 8/2009 | Davies | G06Q 10/06 | |
| 7,574,339 B2 * | 8/2009 | Lukis | G06F 17/505 | 700/197 |
| 7,590,466 B2 | 9/2009 | Lukis et al. | | |
| 7,590,565 B2 * | 9/2009 | Ward | G06Q 10/08 | 705/26.8 |
| 7,603,191 B2 * | 10/2009 | Gross | G06F 17/50 | 700/97 |
| 7,606,628 B2 * | 10/2009 | Azuma | G06F 17/50 | 700/107 |
| 7,630,783 B2 * | 12/2009 | Walls-Manning | B29C 33/3835 | 700/200 |
| 7,656,402 B2 * | 2/2010 | Abraham | G06Q 30/06 | 345/419 |
| 7,689,936 B2 * | 3/2010 | Rosel | G06F 3/04842 | 715/822 |
| 7,733,339 B2 * | 6/2010 | Laning | G06F 17/50 | 345/419 |
| 7,747,469 B2 * | 6/2010 | Hinman | G06Q 30/06 | 705/26.81 |
| 7,748,622 B2 * | 7/2010 | Schon | G06Q 10/06 | 235/380 |
| 7,761,319 B2 * | 7/2010 | Gil | G06Q 10/06 | 705/7.12 |
| 7,822,682 B2 * | 10/2010 | Arnold | G06Q 10/08 | 705/39 |
| 7,836,573 B2 * | 11/2010 | Lukis | B23Q 3/086 | 164/17 |
| 7,840,443 B2 * | 11/2010 | Lukis | G06Q 10/04 | 700/97 |
| 7,908,200 B2 * | 3/2011 | Scott | G06Q 10/0875 | 705/29 |
| 7,957,830 B2 * | 6/2011 | Lukis | B29C 33/3835 | 249/195 |
| 7,979,313 B1 * | 7/2011 | Baar | G06Q 10/087 | 705/26.1 |
| 7,993,140 B2 * | 8/2011 | Sakezles | G09B 23/306 | 434/267 |
| 8,000,987 B2 * | 8/2011 | Hickey | G06Q 10/025 | 705/6 |
| 8,024,207 B2 * | 9/2011 | Ouimet | G06Q 10/06 | 705/7.11 |
| 8,065,741 B1 * | 11/2011 | Coblentz | G06F 21/10 | 726/27 |
| 8,140,401 B2 | 3/2012 | Lukis et al. | | |
| 8,170,946 B2 * | 5/2012 | Blair | G06F 17/227 | 700/106 |
| 8,175,933 B2 * | 5/2012 | Cook, Jr. | G06Q 10/10 | 705/26.5 |
| 8,180,396 B2 * | 5/2012 | Athsani | G06F 3/011 | 455/418 |
| 8,209,327 B2 * | 6/2012 | Danish | G06Q 30/0208 | 705/14.11 |
| 8,239,284 B2 | 8/2012 | Lukis et al. | | |
| 8,249,329 B2 * | 8/2012 | Silver | G06K 9/4609 | 382/141 |
| 8,271,118 B2 * | 9/2012 | Pietsch | G05B 19/40938 | 700/104 |
| 8,275,583 B2 * | 9/2012 | Devarajan | G06Q 10/04 | 703/1 |

(56) References Cited

U.S. PATENT DOCUMENTS

| | | | |
|---|---|---|---|
| 8,295,971 B2* | 10/2012 | Krantz | G05B 19/4097 345/419 |
| 8,412,588 B1* | 4/2013 | Bodell | G06Q 30/0603 705/26.5 |
| 8,417,478 B2* | 4/2013 | Gintis | H04L 12/2697 702/118 |
| 8,441,502 B2* | 5/2013 | Reghetti | G06F 17/50 345/635 |
| 8,515,820 B2* | 8/2013 | Lopez | G06F 17/5004 705/1.1 |
| 8,554,250 B2* | 10/2013 | Linaker | G06K 9/00979 345/173 |
| 8,571,298 B2* | 10/2013 | McQueen | G06K 9/00 235/378 |
| 8,595,171 B2* | 11/2013 | Qu | G06F 17/50 703/13 |
| 8,606,656 B1* | 12/2013 | Franklin | G06Q 30/06 705/27.1 |
| 8,700,185 B2* | 4/2014 | Yucel | G06F 17/5086 700/1 |
| 8,706,607 B2* | 4/2014 | Sheth | G06Q 30/06 705/37 |
| 8,768,651 B2 | 7/2014 | Bhaskaran et al. | |
| 8,798,324 B2* | 8/2014 | Conradt | G06K 9/4604 382/104 |
| 8,806,398 B2 | 8/2014 | Brathwaite et al. | |
| 8,830,267 B2* | 9/2014 | Brackney | G06Q 10/06 345/632 |
| 8,849,636 B2* | 9/2014 | Becker | B64F 5/00 345/419 |
| 8,861,005 B2* | 10/2014 | Grosz | G06F 3/0484 358/1.1 |
| 8,874,413 B2* | 10/2014 | Mulligan | G06F 17/509 703/2 |
| 8,923,650 B2* | 12/2014 | Wexler | G01C 11/04 382/286 |
| 8,977,558 B2* | 3/2015 | Nielsen | G06Q 10/103 701/491 |
| 9,037,692 B2* | 5/2015 | Ferris | G06F 9/5072 709/220 |
| 9,055,120 B1* | 6/2015 | Firman | G06F 8/60 |
| 9,106,764 B2* | 8/2015 | Chan | H04M 1/0254 |
| 9,148,350 B1* | 9/2015 | Suryanarayanan | H04L 43/08 |
| 2001/0023418 A1 | 9/2001 | Suzuki et al. | |
| 2001/0024318 A1* | 9/2001 | Atieh | H01S 3/06754 359/341.1 |
| 2001/0047251 A1* | 11/2001 | Kemp | G06F 17/5004 703/1 |
| 2002/0026398 A1* | 2/2002 | Sheth | G06Q 30/0601 705/37 |
| 2002/0032763 A1* | 3/2002 | Cox | H04L 69/329 709/223 |
| 2002/0065790 A1* | 5/2002 | Oouchi | G06F 17/50 705/400 |
| 2002/0087440 A1* | 7/2002 | Blair | G06Q 10/06 705/29 |
| 2002/0099579 A1* | 7/2002 | Stowell | G06Q 10/06 705/7.39 |
| 2002/0107673 A1* | 8/2002 | Haller | G05B 19/41805 703/1 |
| 2002/0152133 A1* | 10/2002 | King | G06Q 10/10 705/317 |
| 2003/0018490 A1* | 1/2003 | Magers | G06Q 10/06 703/6 |
| 2003/0069824 A1* | 4/2003 | Menninger | G06Q 10/06 705/37 |
| 2003/0078846 A1* | 4/2003 | Burk | G06Q 10/06 705/22 |
| 2003/0139995 A1* | 7/2003 | Farley | G06Q 10/06 705/37 |
| 2003/0149500 A1* | 8/2003 | Faruque | G06F 17/5018 700/97 |
| 2003/0163212 A1* | 8/2003 | Smith | G06Q 10/06 700/95 |
| 2003/0172008 A1* | 9/2003 | Hage | G06Q 30/02 705/28 |
| 2003/0212610 A1* | 11/2003 | Duffy | G06Q 10/0637 705/26.1 |
| 2003/0220911 A1* | 11/2003 | Tompras | G06F 17/50 |
| 2004/0008876 A1* | 1/2004 | Lure | G06F 19/3406 382/128 |
| 2004/0113945 A1* | 6/2004 | Park | G06F 17/5004 715/765 |
| 2004/0195224 A1* | 10/2004 | Kanodia | B23K 9/0953 219/125.1 |
| 2005/0055299 A1* | 3/2005 | Chambers | G06Q 40/06 705/36 R |
| 2005/0125092 A1* | 6/2005 | Lukis | B22C 19/04 700/197 |
| 2005/0144033 A1* | 6/2005 | Vreeke | G06Q 10/06 705/7.28 |
| 2005/0171790 A1* | 8/2005 | Blackmon | G06Q 50/165 705/315 |
| 2005/0251478 A1* | 11/2005 | Yanavi | G06Q 40/08 705/40 |
| 2005/0273401 A1* | 12/2005 | Yeh | G06Q 30/00 705/29 |
| 2006/0041534 A1* | 2/2006 | Atwell | H04L 43/0817 |
| 2006/0085322 A1* | 4/2006 | Crookshanks | G06Q 30/06 705/37 |
| 2006/0173749 A1* | 8/2006 | Ward | G06Q 10/08 705/26.8 |
| 2006/0185275 A1* | 8/2006 | Yatt | G06F 17/5004 52/236.1 |
| 2006/0253214 A1* | 11/2006 | Gross | G06F 17/50 700/97 |
| 2007/0016437 A1* | 1/2007 | Elmufdi | G06Q 30/02 705/400 |
| 2007/0067146 A1* | 3/2007 | Devarajan | G06Q 10/04 703/7 |
| 2007/0073593 A1* | 3/2007 | Perry | G06Q 30/02 705/26.64 |
| 2007/0112635 A1* | 5/2007 | Loncaric | G06Q 30/02 705/7.35 |
| 2007/0198231 A1* | 8/2007 | Walch | G06F 17/5004 703/1 |
| 2008/0120086 A1* | 5/2008 | Lilley | G06F 17/50 703/21 |
| 2008/0183614 A1* | 7/2008 | Gujral | G06Q 30/02 705/37 |
| 2008/0269942 A1* | 10/2008 | Free | G06F 17/50 700/182 |
| 2008/0281678 A1* | 11/2008 | Keuls | G06Q 10/06393 705/7.34 |
| 2009/0058860 A1* | 3/2009 | Fong | G06F 17/211 345/467 |
| 2009/0208773 A1* | 8/2009 | DuPont | B22F 3/1055 428/610 |
| 2009/0299799 A1* | 12/2009 | Racho | G06Q 30/0249 705/14.48 |
| 2009/0319388 A1* | 12/2009 | Yuan | G06Q 30/0601 705/26.1 |
| 2010/0242005 A1* | 9/2010 | Brathwaite | G06F 17/50 716/106 |
| 2011/0040542 A1* | 2/2011 | Sendhoff | G06F 17/5095 703/8 |
| 2011/0047140 A1 | 2/2011 | Free | |
| 2011/0191708 A1* | 8/2011 | Reed | G06F 3/048 715/765 |
| 2011/0209081 A1 | 8/2011 | Chen et al. | |
| 2011/0213757 A1* | 9/2011 | Bhaskaran | G06Q 10/06 707/687 |
| 2012/0016678 A1* | 1/2012 | Gruber | G06F 17/3087 704/275 |
| 2012/0072299 A1* | 3/2012 | Sampsell | G06Q 30/0611 705/26.4 |
| 2012/0230548 A1* | 9/2012 | Calman | G06K 9/00791 382/104 |

(56) References Cited

U.S. PATENT DOCUMENTS

| | | | | |
|---|---|---|---|---|
| 2012/0316667 | A1* | 12/2012 | Hartloff | G06F 17/50 700/98 |
| 2013/0055126 | A1* | 2/2013 | Jackson | G06F 3/04812 715/769 |
| 2013/0097259 | A1* | 4/2013 | Li | G06Q 10/103 709/206 |
| 2013/0100128 | A1* | 4/2013 | Steedly | G06T 7/0061 345/419 |
| 2013/0138529 | A1* | 5/2013 | Hou | G06Q 30/0621 705/26.5 |
| 2013/0144566 | A1* | 6/2013 | De Biswas | G06T 17/005 703/1 |
| 2013/0166470 | A1* | 6/2013 | Grala | G06Q 10/08345 705/335 |
| 2013/0218961 | A1* | 8/2013 | Ho | G06Q 30/02 709/204 |
| 2013/0293580 | A1 | 11/2013 | Spivack | |
| 2013/0297320 | A1* | 11/2013 | Buser | B29C 67/0055 704/275 |
| 2013/0297460 | A1* | 11/2013 | Spivack | G06Q 30/0643 705/27.2 |
| 2013/0311914 | A1* | 11/2013 | Daily | G06F 8/38 715/763 |
| 2013/0325410 | A1* | 12/2013 | Jung | G06F 17/5004 703/1 |
| 2013/0346268 | A1* | 12/2013 | Pereira | G06F 8/65 705/34 |
| 2014/0042136 | A1* | 2/2014 | Daniel | B23K 9/0953 219/130.5 |
| 2014/0067333 | A1* | 3/2014 | Rodney | G06T 19/00 703/1 |
| 2014/0075342 | A1* | 3/2014 | Corlett | G06F 17/50 715/753 |
| 2014/0098094 | A1* | 4/2014 | Neumann | G06K 9/00214 345/420 |
| 2014/0157579 | A1* | 6/2014 | Chhabra | G06F 17/00 29/592 |
| 2014/0207605 | A1* | 7/2014 | Allin | G06Q 30/0611 705/26.4 |
| 2014/0229316 | A1* | 8/2014 | Brandon | G06Q 30/0611 705/26.4 |
| 2014/0258155 | A1* | 9/2014 | Suryanarayanan | H04L 63/10 705/318 |
| 2014/0279177 | A1* | 9/2014 | Stump | G06Q 30/0611 705/26.4 |
| 2014/0309765 | A1* | 10/2014 | Blanchfield, Jr. | B29C 64/386 700/119 |
| 2014/0379119 | A1* | 12/2014 | Sciacchitano | G05B 19/4099 700/182 |
| 2015/0052024 | A1* | 2/2015 | Apsley | G06Q 30/0619 705/26.81 |
| 2015/0055085 | A1* | 2/2015 | Fonte | G06Q 30/0621 351/178 |
| 2015/0066189 | A1* | 3/2015 | Mulligan | G06Q 30/0621 700/136 |
| 2015/0127480 | A1* | 5/2015 | Herrman | G06Q 30/0283 705/26.4 |
| 2015/0234377 | A1* | 8/2015 | Mizikovsky | G06F 17/5004 700/98 |

FOREIGN PATENT DOCUMENTS

| | | | |
|---|---|---|---|
| WO | 2001077781 | A2 | 10/2001 |
| WO | 2006086332 | A2 | 8/2006 |
| WO | 2007067248 | A2 | 6/2007 |
| WO | 2011139630 | A1 | 11/2011 |
| WO | 2011140646 | | 11/2011 |
| WO | 2011140646 | A1 | 11/2011 |
| WO | 2013058764 | A1 | 4/2013 |
| WO | 2014152396 | A2 | 9/2014 |

OTHER PUBLICATIONS

Dassault Systemes—Solidworks Corporation. Instructor's Guide to Teaching SolidWorks Software, https://www.solidworks.com/sw/docs/instructor_wb_2011_eng.pdf https://web.archive.org/web/20130626033829/https://www.solidworks.com/sw/docs/instructor_wb_ 2011_eng.pdf. Jun. 26, 2013 (Year: 2013).*

"Quartiles." Mathisfun.com. Web. <https://www.mathsisfun.com/data/quartiles.html>. Archive. <https://web.archive.org/web/20100909011751/http://www.mathsisfur.com/data/quartiles.html>.

Wu et al. Interactive 3D Geometric Modelers with 2D UI, 2002, State University of Campinas, www.dca.fee.unicamp.br, Sao Paulo, Brazil; 2002, 8 pages.

"Upload Your Photos, Print a 3D Model with hypr3D." SolidSmack. http://www.solidsmack.com/cad-design-news/hypr3d-photo-video-3d-print/; last accessed on Oct. 13, 2015.

"123D Catch." Autodesk, http://apps.123dapp.com/catch/.

Rothganger et al. "3D Object Modeling and Recognition from Photograph and Image Sequences." Toward Category-Level Object Recognition. 2006, pp. 105-126, vol. 4170 of the series Lecture Notes in Computer Science. Springer Berlin Heidelberg.

Dealer Information Systems Corporation. "Parts Inventory." http://dis-corp.com/content/agriculture/inventory/parts-inventory.

EMachineShop. "Emachineshop Features." http://www.emachineshop.com/machine-shop/Features/page518.html.

Retrieved from:http://www.solidworks.com/sw/products/3d-cad/manufacturing-cost-estimation-quoting.htm p. 1: Automatic Manufacturing Cost Estimation Overview; Solidworks; 2015.

Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.

http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.

Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.

http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05.

http://www.bridgelinedigital.com/File%20Library/Repository/eCommerc Sample-eCommerce-RFP-Template_Bridgeline-Digital.pdf. Sample RFP Template: Ecommerce Platform, Bridgeline Digital, 2014.

Matchbook, Tealbook, http://www.matchbookinc.com/ Sep. 28, 2015.

3Diligent, Source Smarter, http://www.3diligent.com/customer.html; Sep. 28, 2015.

Dassault Systemes, Brochure, Mar. 24, 2010: New Features Type3ToCatia http://www.type3.us/content/download/2202/405535/file/New%20Feature_Type3ToCatia_2010_US%20old.pdf.

Xue, S., X. Y. Kou, and S. T. Tan. "Natural voice-enabled CAD: modeling via natural discourse." Computer-Aided Design and Applications 6.1 (2009): 125-136.

Kou, X. Y., S. K. Xue, and S. T. Tan. "Knowledge-guided inference for voice-enabled CAD." Computer-Aided Design 42.6 (2010): 545-557.

Sharma, Anirudh, et al. "MozArt: a multimodal interface for conceptual 3D modeling." Proceedings of the 13th international conference on multimodal interfaces. ACM, 2011.

Sorpas ("User Manual,", Swanted Software and Engineering Aps, 2011 (120 pages)).

U.S. Appl. No. 14/267,447, Aug. 5, 2015, Office Action.

U.S. Appl. No. 14/197,922, Nov. 26, 2014, Office Action.

U.S. Appl. No. 14/197,922, Apr. 27, 2015, Response to Office Action.

U.S. Appl. No. 14/197,922, May 15, 2015, Office Action.

U.S. Appl. No. 14/267,447, Jun. 18, 2015, Response to Office Action.

(56) References Cited

OTHER PUBLICATIONS

U.S. Appl. No. 14/263,665, Oct. 8, 2015, Office Action.
U.S. Appl. No. 14/053,222, Jan. 29, 2016, Office Action.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/060,033, filed Oct. 22, 2013.
U.S. Appl. No. 14/053,222, filed Oct. 14, 2013.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.
U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

METHODS AND SOFTWARE FOR REQUESTING A PRICING IN AN ELECTRONIC MARKETPLACE USING A USER-MODIFIABLE SPECTRUM INTERFACE

FIELD OF THE INVENTION

The present invention generally relates to the field of computer-aided design. In particular, the present invention is directed to methods and software for requesting a pricing in an electronic marketplace using a user-modifiable spectrum interface.

BACKGROUND

Computer-aided design (CAD) programs allow designers to create computer models of products to be manufactured. After a design is complete, the designer or the designer's purchasing agent typically then seeks out one or more suppliers, or fabricators to send a request for pricing (hereinafter, "RFP") in order to obtain a price associated with manufacturing the designed structure. Purchasing agents and suppliers, among others, often utilize viewing software to examine designers' CAD models, but such software is often limited to only viewing and does not allow changes to the CAD model nor the ability to automatically obtain pricing from the CAD model.

SUMMARY OF THE DISCLOSURE

In an implementation, the present disclosure is directed to a method of enabling a user to request a pricing, via an electronic marketplace, from each of one or more potential suppliers for fabricating a structure represented in a computer-aided design (CAD) model. The method is executed in a marketplace system and includes displaying to the user a marketplace graphical user interface (GUI); displaying to the user, in the marketplace GUI, a view window designed and configured to display at least a portion of the CAD model; displaying to the user, in the marketplace GUI, a set of marketplace-tool selectors for allowing the user to select from among a corresponding set of marketplace tools that allow the user to interact with the marketplace; and displaying to the user, in the marketplace GUI, a spectrum GUI designed and configured to allow the user to selectively add CAD-tools functionality to the marketplace GUI.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present invention include methods and software for requesting a pricing in an electronic marketplace using a user-modifiable "spectrum" interface. A request for pricing may include, but not be limited to, a bid solicitation, a cost estimate request, or a firm price estimate request, among others, and, as implied, a price may include, but similarly not be limited to, a bid, a cost estimate, or a firm price estimate. As used herein and in the appended claims, the term "spectrum" is used to denote that a corresponding viewer or other interface has a set of functionalities that a user can modify as desired. For example, the functionalities may correspond to various manipulations of a CAD model of a structure that is the subject of a request for pricing for fabrication, and a user may add to and/or delete from this set the functionalities contained therein as desired. Herein, a structure may be an object or part having a particular geometry, while a computer model may be a virtual representation of a structure and may be created using one or more appropriate CAD programs. Examples of a structure include a piece of sheet metal, a solid cube, a cylindrical pipe, an injection molded plastic toy, apparel such as a shirt made of cotton, and an assembly of various parts such as a vehicle, among others. A project (or design) may refer to a CAD model part or an assembly of CAD model parts that may be a virtual representation of a particular structure and may be created using one or more appropriate CAD programs.

In some embodiments, software made in accordance with the present invention displays a marketplace interface, which displays at least a portion of a CAD model and a set of marketplace tool selectors to a user such that the user can manipulate the tool selectors to interact with an electronic marketplace. In an exemplary embodiment, the marketplace interface includes a spectrum viewer designed and configured to allow the user to selectively augment a marketplace interface with additional CAD-model functionality. One or more aspects of the present invention can be implemented in any of a wide variety of manners, such as within a single computing device or by two or more networked computing devices, among others. In some embodiments, functionalities of the system may be integrated into computer modeling programs directly via add-on software.

Figure 1:
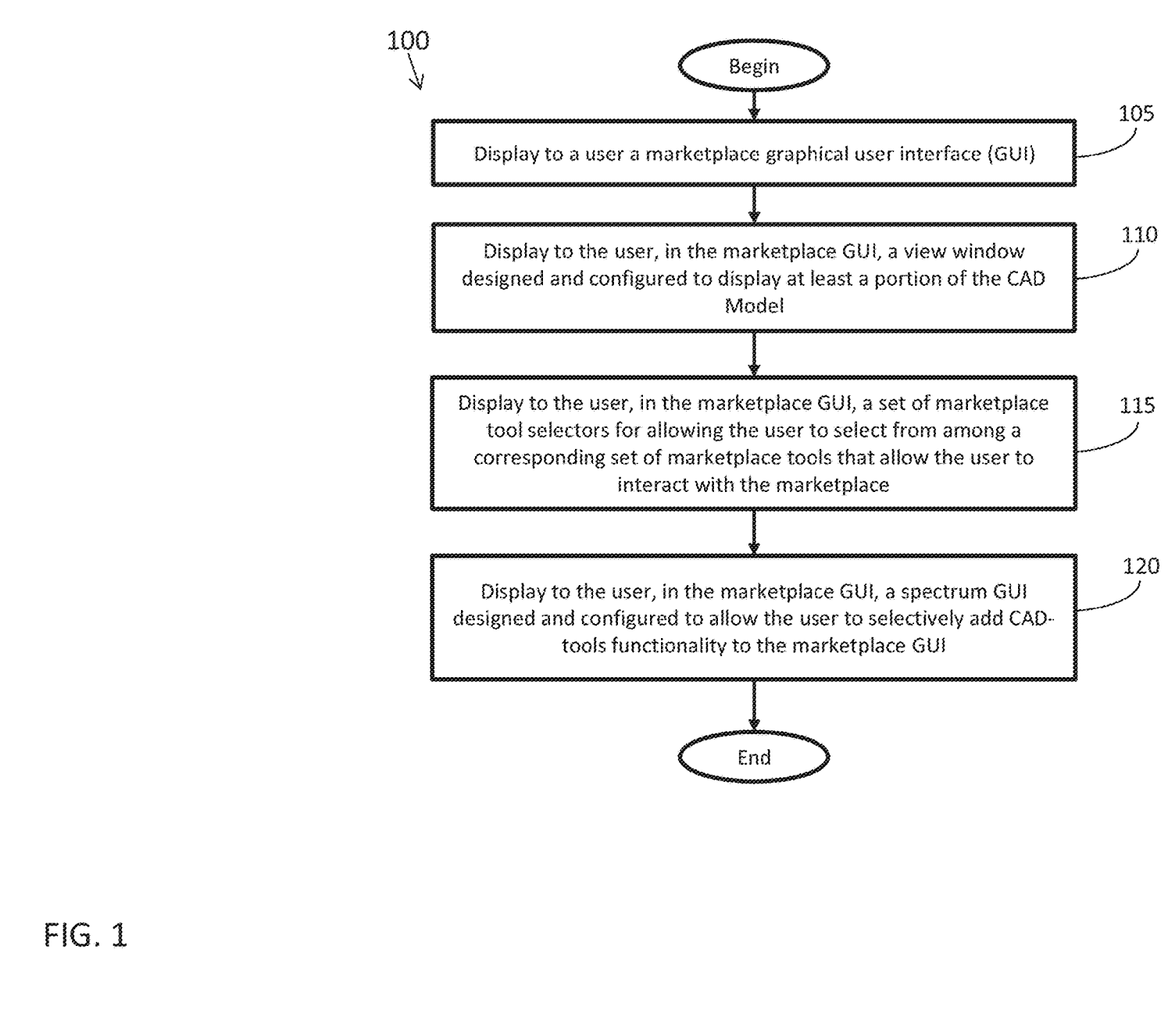
FIG. 1 is a flow diagram illustrating a method of requesting a pricing in an electronic marketplace using a user-modifiable spectrum interface.

Turning now to the drawings, FIG. 1 illustrates a method 100 of requesting a pricing in an electronic marketplace according to exemplary aspects of the present invention. One or more systems made in accordance with the present invention (examples of such being further described hereinbelow) may implement aspects of method 100 using one or more platforms such as a computer, a system of computers, an Internet application, a web browser, etc., or any combination of these. The various step of method 100 will first be introduced and then followed by further explanation and examples that will lead the reader to a deeper understanding of the method. Exemplary method 100 may begin with step 105, at a marketplace graphical user interface (GUI) is displayed to a user, such as, for example, a purchasing agent or a supplier. This displaying of the marketplace GUI may be performed by, for example, electronic marketplace software. At step 110, the software may display to the user a view window designed and configured to display at least a portion of a locally or remotely stored CAD model. The software may display this view window, for example, in the marketplace GUI. At step 115, the software may display a set of marketplace tool selectors for allowing the user to select from among a corresponding set of marketplace tools that allow the user to interact with the marketplace to the user in the marketplace GUI. At step 120, the system(s) may display a spectrum GUI to the user in the marketplace GUI. As alluded to above, the spectrum GUI may be designed and configured to allow a user to selectively augment the functionality of the marketplace GUI by adding CAD-tools functionality and/or other functionality typically associated with fully featured CAD programs, such as tools a user may utilize to alter the geometry of, change the material and/or finish of, and/or change purchased components associated with one or more CAD models or designs.

Figure 2:
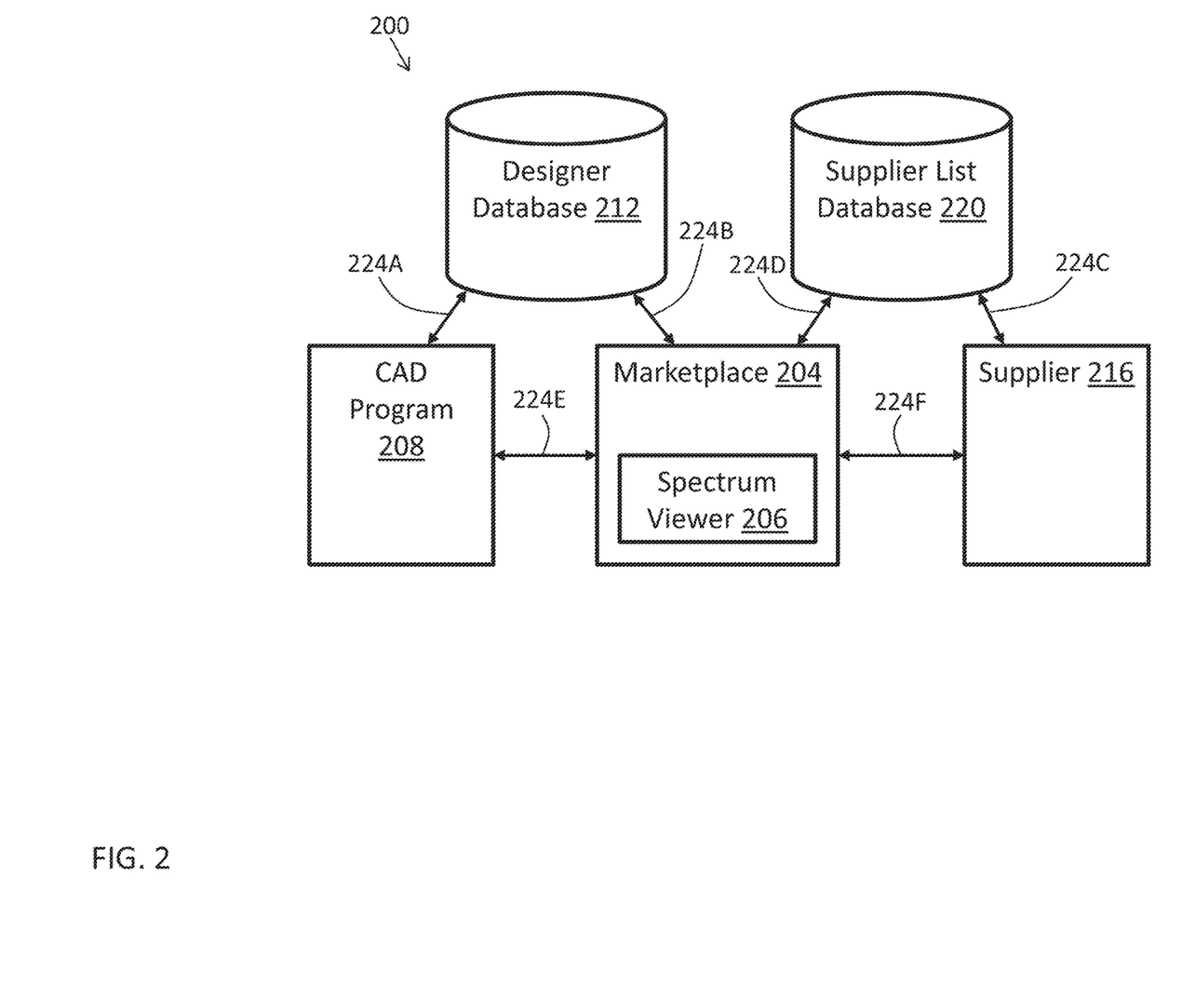
FIG. 2 is a high-level block diagram of a marketplace system that includes a user-modifiable spectrum interface of the present disclosure.

FIG. 2 illustrates an exemplary electronic marketplace system 200 in which method 100 of FIG. 1 may be implemented. In this example, marketplace system 200 enables one or more designers to post project designs and associated requests for pricing to a marketplace (not shown), here electronic marketplace 204, accessible by one or more purchasing agents and suppliers, such as supplier 216, that may review designs and place prices on the work associated with the creation of one or more project designs. Marketplace 204 may include software that enables communication between/among designers, suppliers, purchasing agents, and/or others and may comprise, for example, one or more stand-alone or add-on programs (e.g., for use with CAD program 208 or other programs), one or more websites, a distributed or decentralized network, and/or a peer-to-peer network, among other known types of networks, servers, clients, and programs/add-ons. Notably, in some embodiments, marketplace 204 may implement all of the steps of method 100 of FIG. 1, though in other embodiments other components, such as a marketplace client or add-on program, may implement one or more steps. Marketplace 204 may further include a spectrum viewer 206, which users may access independently or through one or more other programs to view CAD models, interact with the marketplace, and/or utilize one or more CAD tools and/or other functionality typically associated with fully featured CAD programs, as described further below in the context of FIG. 3. Spectrum viewer 206 may comprise and/or be accessed through a marketplace client that may, by default, lack one or more capabilities of typical CAD programs, such as the ability to design or modify computer models. In some alternative embodiments, spectrum viewer 206 may be located outside of marketplace 204, a separate program or application, and/or accessed by means other than marketplace 204, while still allowing spectrum viewer to access marketplace 204.

In use, a designer may upload or otherwise communicate one or more requests for pricing, which may include one or more design documents and/or specifications, to marketplace 204. In some embodiments, a designer may interact with marketplace 204 via CAD program 208, which may comprise one or more individual programs and may be augmented with non-CAD programs such as, for example, a marketplace client that may, by default, lack one or more capabilities of typical CAD programs, such as the ability to design or modify computer models. Designers may use CAD program 208 to design virtual computer models and/or to generate data to send to marketplace 204 and/or a designer database 212. For example, a designer may upload a request for pricing including information associated with a CAD model design and/or project from CAD program 208 to designer database 212, which may then communicate the information or otherwise make the information available to marketplace 204. In some embodiments, CAD program 208 may communicate directly with marketplace 204. One or more suppliers, such as supplier 216, may then interact with marketplace 204 to place prices on one or more designs included in or otherwise accessible by the marketplace.

As mentioned above, marketplace system 200 may include a designer database 212. Designer database 212 may store information associated with a design, such as a design generated in a CAD program 208, and may comprise, for example a server, a hard drive, a CD, a flash drive, and/or cloud storage, among other known data storage devices/services. In some embodiments, designer database 212 may comprise two or more databases and may include design and/or designer information such as design fabrication specifications and/or documents, CAD files, design images, materials, quantities, need dates, and/or shipping addresses, among others.

Supplier 216 may be one or more entities that place prices on and/or fabricate one or more parts or projects posted by one or more designers and may be, for example, a manufacturer of sheet metal parts. System 200 may further include a supplier program similar or equivalent to CAD program 208 for allowing a supplier to generate pricing data to be sent to a marketplace and for receiving various data, such as request for pricing and designer information, from the marketplace and/or accepting/reviewing requests for pricing, among other things. Similarly to designer program 208, such a supplier program may comprise, for example, a plurality of programs/websites and/or a single program or website, which may be accessible by one or more supplier 216, among other implementations that will become readily apparent to one of ordinary skill after reading this disclosure in its entirety. In some embodiments, one or more supplier and/or supplier programs may communicate directly with marketplace 204. Alternatively, marketplace 204 may contain such supplier programs and/or necessary supplier data for generating pricing request data without the need to regularly access supplier 216 for each request for pricing.

System 200 may further include a supplier list database 220 for storing information associated with prices from one or more suppliers, such as one or more prices placed by one or more suppliers, a current winning or lowest price, and/or supplier information such as supplier location, capabilities, etc. As with designer database 212, supplier list database 220 may comprise, for example, a server, a hard drive, a CD, a flash drive, and/or cloud storage, among other known data storage devices/services. In some embodiments, supplier input database 124 may comprise two or more databases.

System 200 further provides a number of data links to enable data communication between various portions thereof. The system may implement these links in the form of, for example, an Internet connection, a local network connection, and/or any other connection between electronic devices or portions of one or more devices. For example, system 200 may provide a design specifications data link 224A between CAD program 208 and designer database 212 that may transmit the contents of designs, design specifications, and/or designer information from CAD program 208 to storage within designer database 212. System 200 may also provide a design input data link 224B between designer database 212 and marketplace 204 that may allow new prices and project details to be stored within designer database 212, as well as allowing the most recent prices to be loaded into marketplace 204 from designer database 212 upon the accessing of marketplace 204 by a designer or supplier. System 200 may further provide a supplier upload data link 224C between supplier 216 and supplier list database 220 that may transmit prices from the supplier and/or a supplier program to storage within supplier list database 220. System 200 may additionally provide a supplier pricing data link 224D between supplier list database 220 and marketplace 204 that may allow new prices and project details to be stored within supplier list database 220, as well as allowing the most recent prices to be loaded into marketplace 204 from supplier list database 220 upon the accessing of marketplace 204 by a designer or supplier. System 200 may also include a design output data link 224E between marketplace 204 and CAD program 208 that may transmit various pricing and supplier information from marketplace 204 to the CAD program. System 200 may further include a supplier output data link 224F between marketplace 204 and supplier 216 that may transmit various pricing and designer information from marketplace 204 to a supplier or supplier program.

In operation, a designer may upload a request for pricing including information associated with a CAD model design and/or project from CAD program 208 to designer database 212, which may then communicate the information or otherwise make the information available to marketplace 204. Similarly, a supplier 216 may upload capability data reflecting its manufacturing capabilities to supplier list database 220 via supplier upload data link 224C, which may transmit or otherwise make available the capability data to marketplace 204, either immediately or in response to a supplier, designer, purchasing agent, or other request. A user, such as a purchasing agent or supplier, may access information stored in marketplace 204, such as one or more CAD model designs, via spectrum viewer 206. Alternatively, a CAD model design may be stored elsewhere and may be accessed by a third party via spectrum viewer 206 in order to make changes to the design and/or request a price for the design via marketplace 204.

Figure 3:
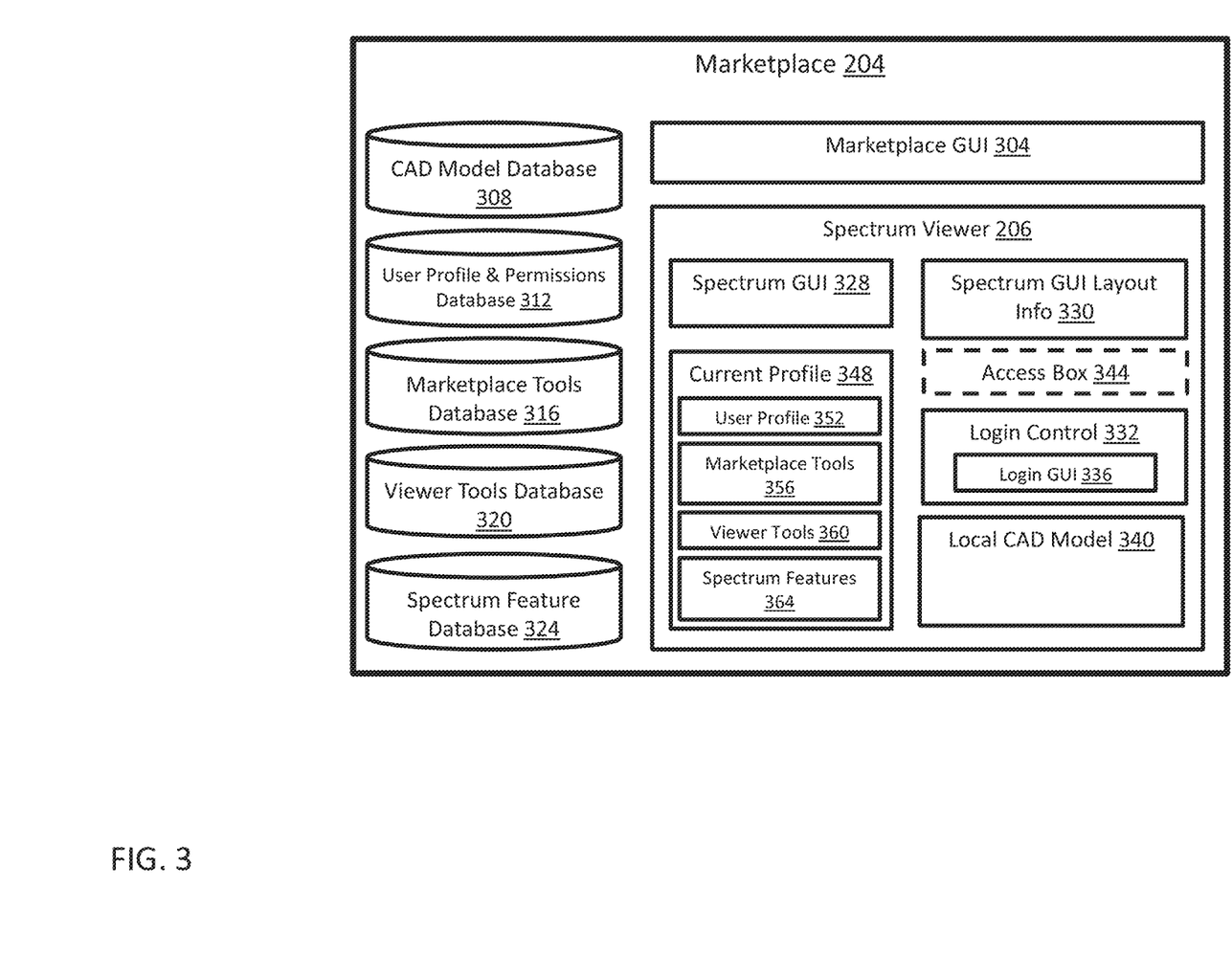
FIG. 3 is a block diagram illustrating further details of the marketplace system and spectrum interface of FIG. 2.

FIG. 3 illustrates an exemplary marketplace 204 made in accordance with the present invention. In some embodiments, marketplace 204 may receive one or more projects posted by one or more designers and allow one or more purchasing agents and/or suppliers to review, place custom pricing on, and/or compete for posted projects. Marketplace 204 may include a marketplace GUI 304, which may comprise software allowing for interaction between a user and the marketplace. In one example, marketplace 204 may implement marketplace GUI 304 in the form of a display presenting default marketplace features and an interface allowing a user to access spectrum viewer 206. Marketplace 204 may further include a CAD model database 308, which may comprise a database or group of databases containing one or more computer models that a user may have designed within CAD program 208 and/or that the user may import into marketplace 204. Marketplace 204 may also include a user profile and permissions database 312, which may comprise a database or group of databases and may store user profiles for any users permitted to access spectrum viewer 206 along with permission information identifying the particular tools/functionality each user is entitled to access. Marketplace 204 may additionally include a marketplace tools database 316, which may comprise a database or group of databases and may store marketplace tools in the form of, e.g., source code or executable files. A user may utilize spectrum viewer 206 to retrieve and/or utilize such marketplace tools from marketplace tools database 316 provided that they have appropriate permissions associated with their user profile. Marketplace tools may include, e.g., tools that allow a user to interface with marketplace 204 and/or control operation of the marketplace, such as tools to place orders or sort and filter suppliers. Still further, marketplace 204 may include a viewer tools database 320, which may comprise a database or group of databases and may store viewer tools in the form of, e.g., source code or executable files. A user may utilize spectrum viewer 206 to retrieve and/or utilize such viewer tools from viewer tools database 320 provided that they have appropriate permissions associated with their user profile. Viewer tools may include, e.g., tools that allow a user to manipulate a display of a CAD model, such as tools that rotate, pan, zoom, and/or take screenshots.

Marketplace 204 may further include a spectrum feature database 324, which may comprise a database or group of databases and may store and/or index spectrum features/functionality. A user may utilize spectrum viewer 206 to retrieve and/or utilize such spectrum features from spectrum feature database 324 provided that they have appropriate permissions associated with their user profile. Spectrum features may include functionality typically associated with fully featured CAD programs that a user may utilize to, e.g., directly manipulate and/or alter a CAD model, such as tools to change the size of a structure and/or to change a material type. It should be noted that in an alternative embodiment, one or more of CAD model data base 308, user profile and permissions database 312, marketplace tools database 316, viewer tools database 320, and spectrum feature database 324 may be located outside of and/or operate independently from marketplace 204 but may still access marketplace 204 and may be accessible by marketplace 204 and spectrum viewer 206.

As discussed previously, marketplace 204 may include spectrum viewer 206. Spectrum viewer 206 may include a spectrum GUI 328, which may comprise software a user may utilize to interact with the spectrum viewer, such as, for example, a display presenting any marketplace tools, viewer tools, and/or spectrum features the user is entitled to access as specified in settings stored in user profile and permissions database 312. Spectrum viewer 206 may further include spectrum GUI layout information 330, which may indicate an order and/or screen location in which the spectrum viewer may display marketplace tools, viewer tools, and spectrum features in order to provide a consistent and customizable user experience for each individual user. Spectrum viewer may additionally include a login control 332, which may comprise a software program or module that activates when a user attempts to access the spectrum viewer and requires the user to provide identifying information, such as a username and password, before the user can access the spectrum viewer. Login control 332 may further include a login GUI 336, which may comprise a graphical user interface that a user may utilize during a login procedure such as providing a username and password. In some embodiments, login GUI 336 may prevent a user from accessing spectrum viewer 206 and associated components/features without first verifying their identity.

Spectrum viewer 206 may additionally include a CAD model 340, which may include a copy of a CAD model stored in CAD model database 308 that a user may alter or manipulate through spectrum GUI 328. Spectrum viewer 206 may further include an access box 344, which may comprise a programming module that enables and/or governs a user's ability to gain access to additional marketplace tools, viewer tools, and/or spectrum features. Access box 344 may provide an appropriate GUI and grant users access to such tools/features as a function of one or more of a variety of conditions, such as monetary payments and/or an amount of time a user has spent logged into and/or using marketplace 204 and/or spectrum viewer 206, among others. Marketplace 204 and/or spectrum viewer may track an amount of business the user transacts on the marketplace and change the availability and/or cost of selectively adding CAD-tool and/or other functionality as a function of the amount of business the user transacts. In some embodiments, marketplace GUI 304 and/or spectrum viewer 206 may display a a monetary amount the user may be charged for selectively adding CAD-tool and/or other functionality Spectrum viewer 206 may further include a current profile 348, which may comprise a programming module and/or data storage that governs and/or indicates a user's ability to access marketplace tools, viewer tools, and/or spectrum features. It is noted that although current profile 348 is shown as part of spectrum viewer 206, in some embodiments it may be stored/located outside of the spectrum viewer and/or marketplace 204, as appropriate. Current profile 348 may include a user profile 352, which may store data associated with an individual user who is currently accessing marketplace 204 and/or particular tools they are authorized to access. Current profile 348 may further include marketplace tools 356, viewer tools 360, and/or spectrum features 364, which may provide local/remote copies of any or all marketplace tools, viewer tools, and/or spectrum features a user who is currently accessing marketplace 204 is authorized to access. Although marketplace tools 356, viewer tools 360, and/or spectrum features 364 are illustrated as being parts of current profile 348, they may be stored outside of the current profile, spectrum viewer 206, and/or marketplace 204, as appropriate. In one example, the tools 356, 360, and/or 364 may be temporarily or permanently stored on a user's computer.

In operation, a user, such as a supplier or a purchasing agent, may access marketplace 204 via, for example, a marketplace client, a CAD program, a supplier program, a website, and/or an add-on program in order to access marketplace GUI 304, which the user may manipulate to activate or display spectrum viewer 206, though it is noted that in some embodiments marketplace GUI 304 may display spectrum viewer 206 by default without requiring any action from the user. When a user attempts to access spectrum viewer 206, login control 332 may activate login GUI 336, into which the user may enter identifying information, such as a username and password. Login control 332 may verify the identifying information by accessing a profile associated with the user in user profile and permissions database 312. If a user has permission to access spectrum viewer 206, the spectrum viewer may access the information contained in the user's profile in profile and permissions database 312, store the information to user profile 352 in current profile 348, and provide any tools and features to which they have access by loading them from marketplace tools database 316, viewer tools database 320, and spectrum feature database 324 to marketplace tools 256, viewer tools 360, and spectrum features 364, respectively. Then spectrum viewer 206 may activate spectrum GUI 328, which may display buttons corresponding to each tool or feature arranged according to the data in spectrum GUI layout information 330. The user may then access a model stored in CAD model database 308, which spectrum viewer 206 may then store in CAD model 340. Once the user loads a CAD model, the user may activate any tool or feature to which they have access, and, depending on the tools or features they have access to, they may manipulate, view, or alter CAD model 340. The user may access other features of marketplace 204, such as uploading designs and RFPs, prices, etc., through spectrum GUI 328 and/or marketplace GUI 304. After the user finishes working with a loaded CAD model, spectrum viewer 206 or marketplace 204 may store CAD model 340, including any modifications or updates the user made, in CAD model database 308. At any point, the user may optionally utilize access box 344 to purchase or otherwise obtain access to additional tools or features.

Figure 4:
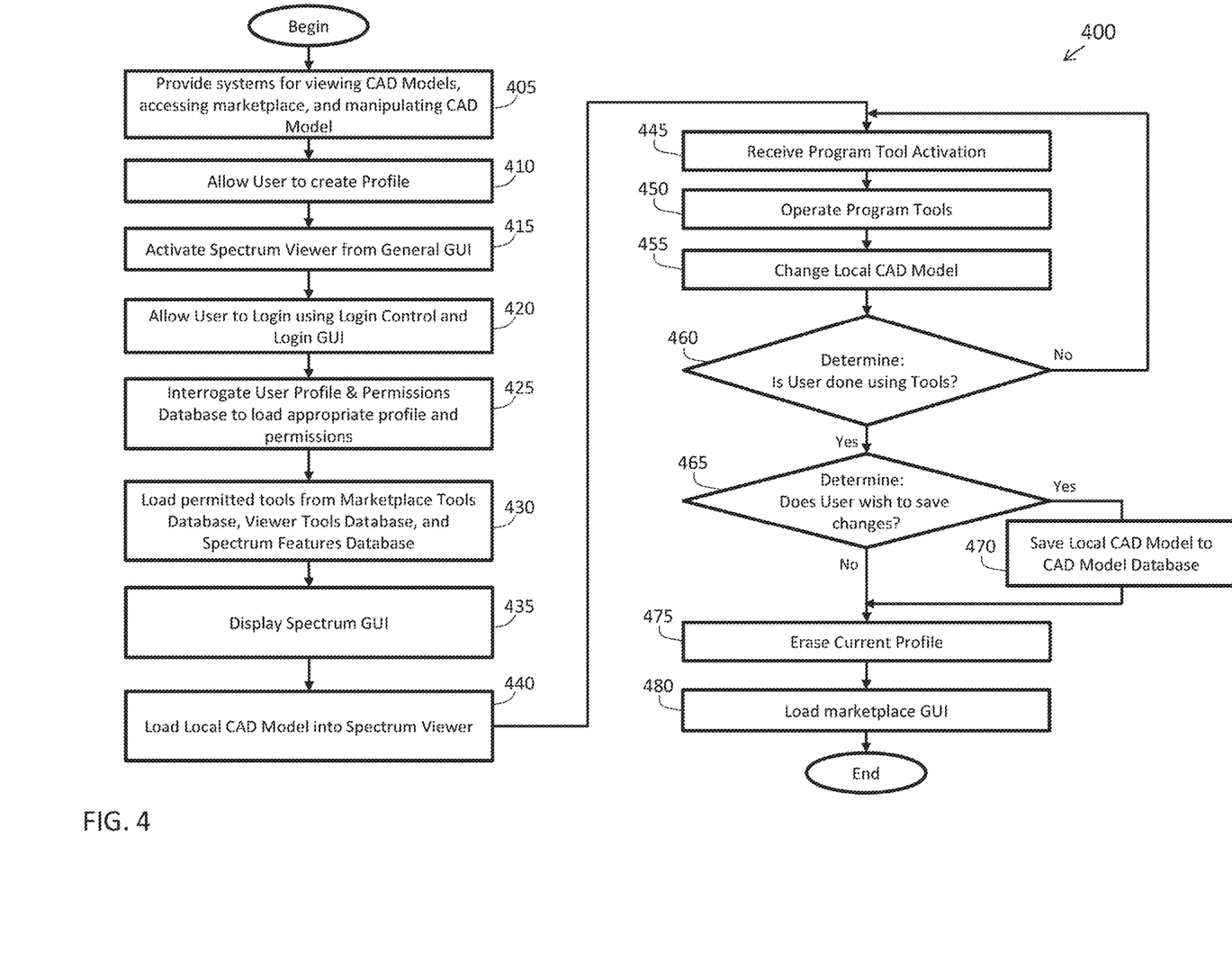
FIG. 4 is a flow diagram illustrating a method of providing a spectrum interface to users of an electronic marketplace.

FIG. 4 illustrates a method 400 for providing a viewer to users of an automated marketplace according to exemplary aspects of the invention that can be implemented by one or more components of system 200 of FIG. 2, as appropriate. In this example, at step 405, one or more systems for viewing CAD models, accessing marketplace 204, and manipulating CAD models may be provided. In some embodiments, step 405 may comprise providing system 200 of FIG. 2.

At step 410, a user may create a profile using, e.g., marketplace GUI 304, spectrum GUI 328, and/or login GUI 336, which marketplace 204 and/or spectrum viewer 206 may then store in user profile and permissions database 312. The user's profile may contain information indicating tools or functionality that the user has access to in marketplace tools database 316, viewer tools database 320, and/or spectrum feature database 324. In some embodiments, marketplace 204 may allow multiple profiles for each individual user. Each profile may specify particular tools that the associated user has purchased or otherwise gained access to using access box 344. In some embodiments, marketplace 204 may provide a default set of tools to each user.

At step 415, a user may manipulate marketplace GUI 304 in order to cause marketplace 204 to activate spectrum viewer 206. In some embodiments, a user may click on or otherwise select a button in marketplace GUI 304 in order to activate spectrum viewer 206, while in other embodiments the marketplace GUI may activate the spectrum viewer when a user loads or imports a CAD file into marketplace 204. At step 420, spectrum viewer 206 may activate login control 332 and login GUI 336 such that a user may log in by providing identifying information to the login control and login GUI. At step 425, one or more of marketplace 204, spectrum viewer 206, and login control 332 may interrogate user profile and permissions database 312 to verify the user's credentials and, in the event of a positive match, may store a profile associated with the user and any permissions associated therewith in current profile 348.

At step 430, spectrum viewer 206 may load one or more tools the user is permitted or authorized to use from marketplace tools database 316, viewer tools database 320, and/or spectrum feature database 324 into current profile 348. In addition, the user may optionally access additional tools or features via access box 344. At step 435, spectrum viewer 206 may display spectrum GUI 328 to the user. Spectrum GUI 328 may include icons and/or soft-selection buttons representing each of marketplace tools 356, viewer tools 360, and spectrum features 364 to which a user profile has access, and the spectrum GUI may display each tool or feature according to the information contained in spectrum GUI layout information 330.

At step 440, spectrum viewer 206 may load a CAD model, though in some embodiments spectrum viewer 206 may already contain one or more CAD models. In one example, spectrum viewer 206 may prompt a user to select a CAD model to load from CAD model database 308, another memory location, a networked location, or other appropriate data storage. At step 445, a user may manipulate spectrum GUI 328 to activate one or more tools or functions, such as one or more of marketplace tools 356, viewer tools 360, and spectrum features 364 via, e.g., soft-selection buttons and/or icons located in the spectrum GUI. For example, spectrum GUI 328 may receive an indication from a user requesting activation of a "rotate" viewer tool, a "request for pricing on this project" marketplace tool, or a "change material" spectrum feature in the form of a user selection of an appropriate button in the spectrum GUI. In some embodiments, these tools may not be accessed by the same user.

At step 450, a user may operate one or more program tools, such as the tool or feature selected in step 445. For example, the user may manipulate a change material spectrum feature to indicate a change from stainless steel to aluminum. In some embodiments, the user may operate two or more tools or features simultaneously. At step 455, the user may save any modifications they have made to CAD model 340 by manipulating appropriate portions of spectrum GUI 328. At step 460, spectrum viewer 206 determines whether the user has finished using the spectrum viewer, which may involve the spectrum viewer receiving an indication of a user selection of a "done" soft selection button. If spectrum viewer 206 determines that the user has finished using spectrum viewer 206, method 400 may proceed to step 465; if the user is still working with the spectrum viewer, method 400 may return to step 445.

At step 465, spectrum viewer 206 determines whether the user wishes to save any changes they have made to CAD model 340, which may involve the spectrum viewer receiving an indication of a user selection of a "save" soft selection button. If spectrum viewer 206 determines that the user wishes to save changes, method 400 may proceed to step 470; otherwise, method 400 may proceed to step 475. At step 470, spectrum viewer 206 may store CAD model 340, including any modifications or updates the user has made, to CAD model database 308, either by overwriting an associated model (e.g., a previous edition of the CAD model) or by saving the information in a new location.

At step 475, spectrum viewer 206 may clear current profile 348 to protect the security of a user's profile and information. Step 475 may include wiping of browser caches or affirmative/secure deletion of hard drive information, among other such known security features. At step 480, spectrum viewer 206 may cease to display spectrum GUI 328 and marketplace 204 may load marketplace GUI 304 such that the same user or a subsequent user can interact with marketplace 204 and/or activate spectrum viewer 206.

Figure 5:
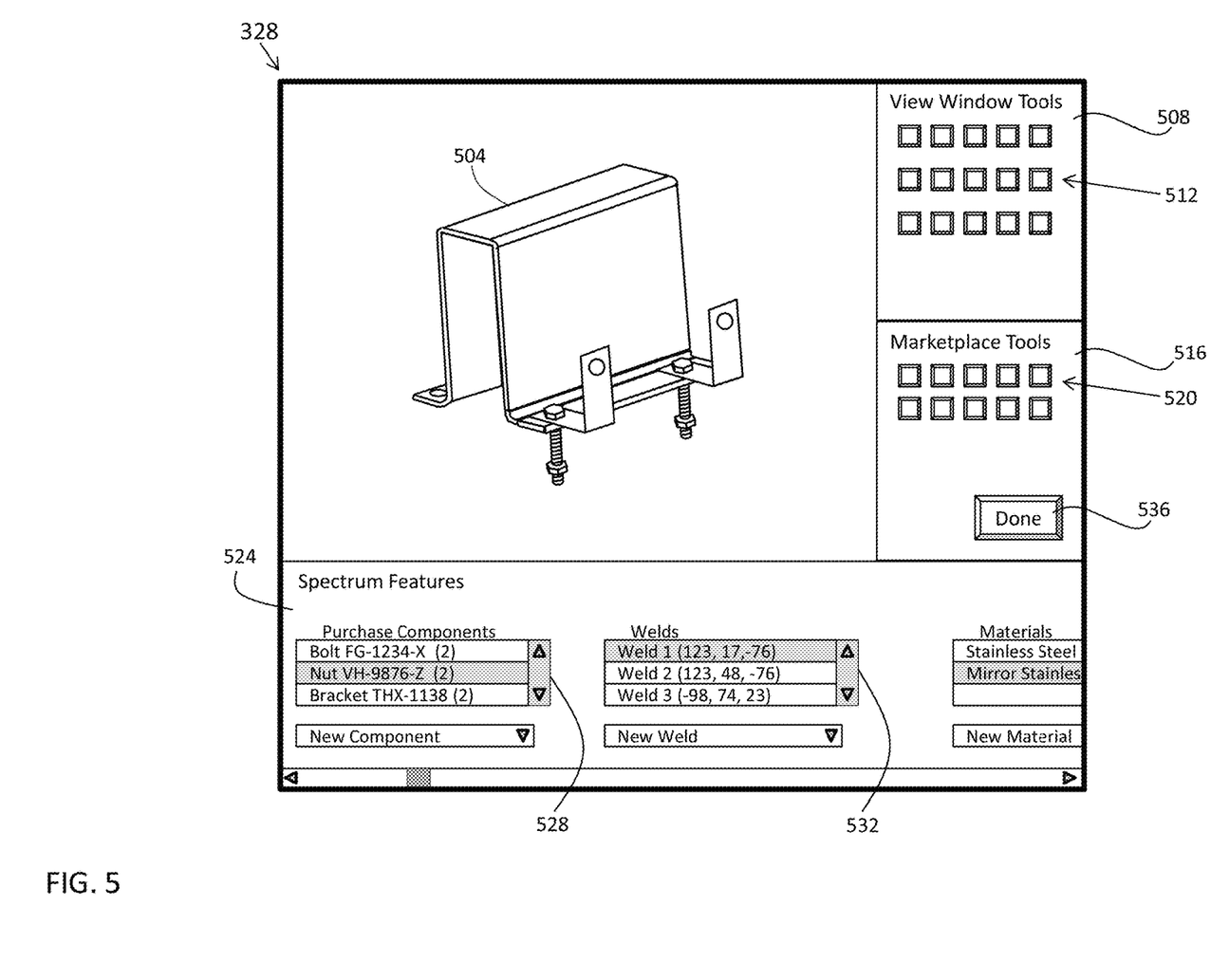
FIG. 5 is a representative screenshot depicting various aspects of an exemplary user interface implemented in accordance with aspects of the invention.

FIG. 5 illustrates a screenshot depicting exemplary aspects of spectrum GUI 328. For example, spectrum GUI 328 may include a structure 504, which may provide a representation of CAD model 340. Spectrum GUI 328 may further include a viewer tools window 508, which may display indicators (e.g., icons or buttons) of viewer tools a user has access to such that the user may select the indicators to activate one or more of the tools. In this example, spectrum GUI 328 provides viewer tools buttons (i.e., CAD-tool selectors) 512 in the form of soft selection buttons that a user may select to activate one or more viewer tools. Spectrum GUI 328 may implement viewer tools buttons 512 in the form of soft-selection buttons or any other appropriate user interface elements; in some embodiments, a user may interact with marketplace 204 and/or spectrum GUI 328 using voice commands.

Spectrum GUI 328 may also include a marketplace tools window 516, which may display indicators of marketplace tools a user has access to such that the user may select the indicators to activate one or more of the tools in order to interact with marketplace 204. In this example, spectrum GUI 328 provides marketplace tools buttons 520, such as, for example, a request for pricing selector and/or a place-order selector, in the form of soft selection buttons that a user may select to activate one or more marketplace tools. As with viewer tools buttons 512, spectrum GUI 328 may implement marketplace tools buttons 520 in the form of soft-selection buttons or any other appropriate user interface elements.

Spectrum GUI 328 may additionally include a spectrum feature window 524 to display any spectrum features to which the current user profile has access such that a user may modify CAD model 340. First spectrum feature 528 of spectrum feature window 524 may include a drop-down menu, which a user may alter or manipulate in order to alter or manipulate one or more portions of CAD model 340. For example, first spectrum feature 528 may provide a user with a menu that the user can manipulate to change, add, or delete one or more purchased components that are part of or associated with CAD model 340 or to access a third party purchased parts catalogs such as the PEM (Penn Engineering & Manufacturing Corp.) catalog, which may be accessed through the Internet and/or represented electronically. Purchase part catalogs may contain third party manufactured parts such as fasteners and other standard components. Second spectrum feature 532 of spectrum feature window 524 may include a drop-down menu similar to first spectrum feature 528. For example, second spectrum feature 532 may provide a user with a menu that the user can manipulate to change one or more welds that are part of or associated with CAD model 340. Spectrum GUI 328 may also include a "done" button 536 that a user may select to indicate that they have finished working with spectrum viewer 206. It is noted that although "done" button 536 is shown within marketplace tools window 516, it may be located anywhere within spectrum GUI 328 or, in some embodiments, anywhere in marketplace GUI 304 or elsewhere.

As would be apparent to one reasonably skilled in the art, the invention may be applied to other manufacturing types, including but not limited to the manufacture of apparel. Both sheet metal and apparel designers use CAD systems to design their products, using sheets of flat material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. Purchased components (in some cases, identical purchased components) may be added to the design. CAD programs may be used to visualize the shape of the finished product. In both sheet metal and apparel manufacturing the sheet (metal or fabric) may be cut or stamped by a variety of methods using computerized machines. Units may be moved from station to station during manufacture. Whereas sheet metal is typically connected by rivets or welding, sheet fabric is typically connected by stitching or gluing. Surface finishes may be applied to both; both may be painted, silk-screened, or otherwise covered with a protective substance.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
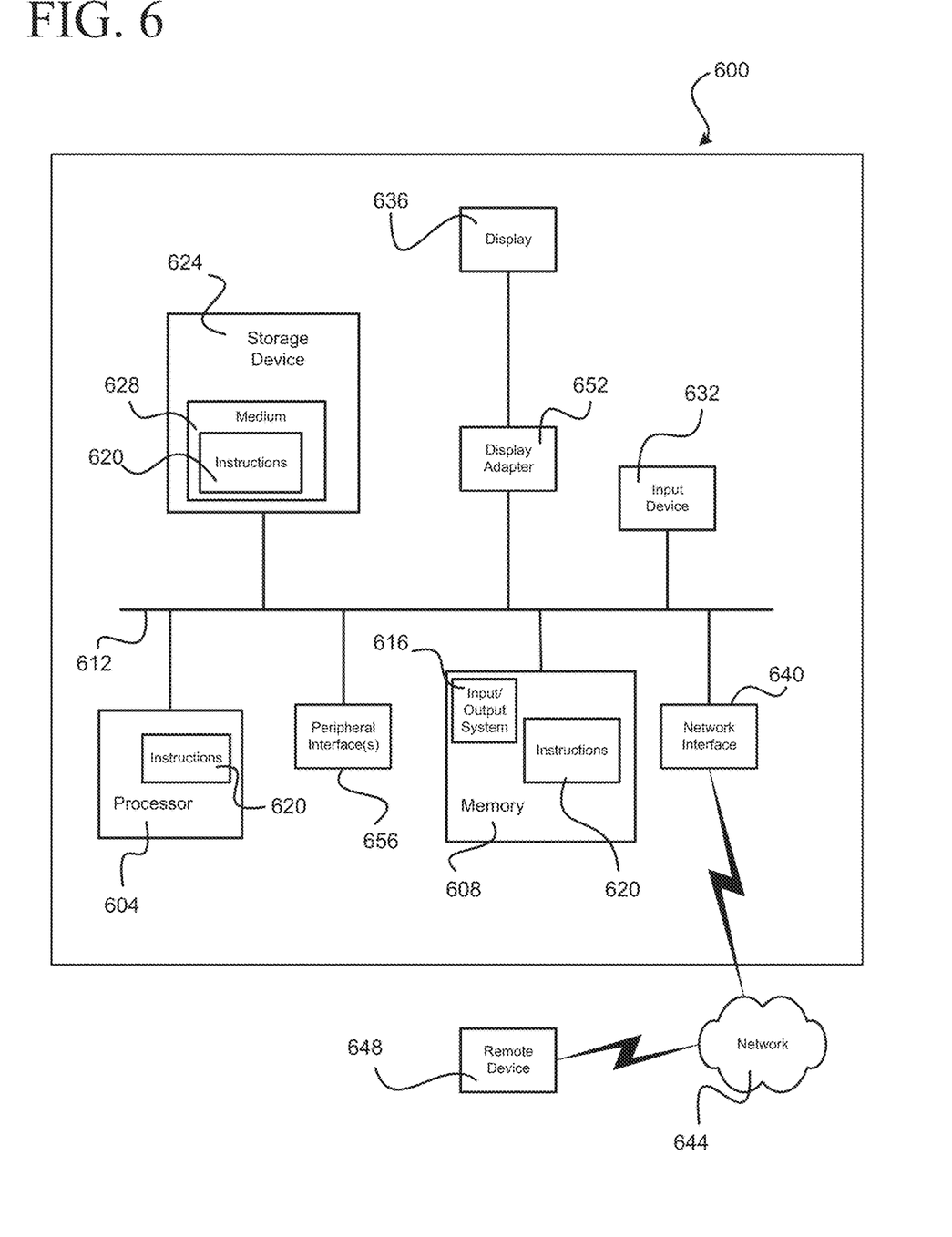
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system, such as the electronic marketplace system 200 of FIG. 2, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine readable media) including, but not limited to, a random access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

What is claimed is:

1. A method of providing a graphical user interface (GUI) for interacting with a computer-aided design (CAD) model, the method being executed in a marketplace system and comprising:
   activating, by a login control implemented on a computing device, a login graphical user interface (GUI);
   receiving, by the login control, identifying information entered by a user in the login GUI;
   accessing, by a spectrum viewer, a user profile associated with the user in a user profile and permission database, wherein:
      the user profile further comprises an identification of one or more particular spectrum features the user is authorized to access; and
      the one or more particular spectrum features include functionality to directly manipulate or alter the CAD model;
   displaying to the user a marketplace graphical user interface (GUI);
   displaying to the user, in the marketplace GUI, a view window designed and configured to display at least a portion of the CAD model, wherein displaying the view window further includes:
      receiving a user selection of the CAD model; and
      loading the CAD model from a CAD model database containing a plurality of CAD models, wherein the CAD model is included in the plurality of models;
   displaying to the user, in the marketplace GUI, a set of marketplace-tool selectors for allowing the user to select from among a corresponding set of marketplace tools that allow the user to interact with an electronic marketplace, wherein the marketplace GUI allows the user to interact with the electronic marketplace by:
      receiving from a user a marketplace tool selection using a marketplace-tool selector of the set of marketplace-tool selectors;
      retrieving at least a marketplace tool from marketplace tools database storing a plurality of marketplace tools as executable files as a function of the marketplace tool selection;
      loading, by the spectrum viewer, from a spectrum feature database storing the one or more particular spectrum features the user is authorized to access, the one or more particular spectrum features the user is authorized to access;
      tracking, by the spectrum viewer, at least a user transaction on the electronic marketplace;
      displaying, by the spectrum viewer, an access box, wherein the access box is configured to enable a user's ability to gain access to additional spectrum features, wherein the availability and cost of at least a spectrum feature is modified as a function of the at least a user transaction on the electronic marketplace;
      displaying, by the spectrum viewer, using a spectrum graphical user interface (GUI), one or more buttons, each button of the one or more buttons corresponding to a spectrum feature of the one or more particular spectrum features the user is authorized to access;
      receiving, at the spectrum GUI, an activation by the user, via a button of the one or more buttons of a selected spectrum feature of the one or more particular spectrum features;
      receiving, by the spectrum viewer, via the selected spectrum feature, a modification to the CAD model; and
      storing, by the spectrum viewer, the CAD model, including the modification, to the CAD model database.

2. A method according to claim 1, wherein said displaying to the user the spectrum GUI includes displaying a plurality of CAD-tool selectors for allowing the user to selectively add corresponding CAD tools.

3. A method according to claim 2, further comprising receiving a user selection of at least one of the plurality of CAD-tool selectors.

4. A method according to claim 3, further comprising, in response to said receiving the user selection, adding a CAD tool corresponding to the user selection to the marketplace GUI.

5. A method according to claim 1, wherein said displaying the set of marketplace-tool selectors includes displaying a request for pricing selector.

6. A method according to claim 1, wherein said displaying the set of marketplace-tool selectors includes displaying a place-order selector.

7. A method according to claim 1, further comprising displaying to the user, in the marketplace GUI, a monetary amount the user is charged for selectively adding CAD-tool functionality.

8. A method according to claim 1, further comprising tracking an amount of business the user transacts on the marketplace.

9. A method according to claim 8, further comprising changing the availability of selectively adding CAD-tool functionality as a function of the amount of business the user transacts.

10. A method according to claim 7, further comprising changing the cost of selectively adding CAD-tool functionality as a function of the amount of business the user transacts.

* * * * *